(12) United States Patent
Donderici et al.

(10) Patent No.: US 11,377,946 B2
(45) Date of Patent: Jul. 5, 2022

(54) BOREHOLE IMAGING TOOL

(71) Applicant: Halliburton Energy Services, Inc., Houston, TX (US)

(72) Inventors: Burkay Donderici, Pittsford, NY (US); Wei-Bin Ewe, Singapore (SG); Ahmed E. Fouda, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 634 days.

(21) Appl. No.: 16/335,220

(22) PCT Filed: Mar. 13, 2018

(86) PCT No.: PCT/US2018/022130
§ 371 (c)(1),
(2) Date: Mar. 20, 2019

(87) PCT Pub. No.: WO2019/177588
PCT Pub. Date: Sep. 19, 2019

(65) Prior Publication Data
US 2021/0372265 A1 Dec. 2, 2021

(51) Int. Cl.
*E21B 47/002* (2012.01)
*G01V 3/28* (2006.01)
*G01V 3/38* (2006.01)

(52) U.S. Cl.
CPC ............ *E21B 47/0025* (2020.05); *G01V 3/28* (2013.01); *G01V 3/38* (2013.01)

(58) Field of Classification Search
CPC ......... E21B 47/0025; G01V 3/28; G01V 3/38
See application file for complete search history.

(56) References Cited

U.S. PATENT DOCUMENTS 3,060,373 A 10/1962 Henri-Georges Doll
3,132,298 A 5/1964 Henri-Georges Doll, et al.
(Continued)

FOREIGN PATENT DOCUMENTS

CA 685727 5/1964
FR 2611054 A1 * 8/1988 ............... G01V 3/28
(Continued)

OTHER PUBLICATIONS

Soumyadipta Sengupta, An Innovative Approach to Image Fracture Dimensions by Injecting Ferrofluids, Nov. 2012, Society of Petroleum Engineers, SPE 162365, pp. 1-6 (Year: 2012).*
(Continued)

*Primary Examiner* — Mischita L Henson
(74) *Attorney, Agent, or Firm* — McGuireWoods LLP

(57) ABSTRACT

The disclosed embodiments include systems and methods to image a borehole. In one embodiment, a borehole imaging system having a borehole imaging tool and a processor is provided. The borehole imaging tool includes a magnetic field source and an array of electrode buttons. The borehole imaging tool also includes a galvanic source operable to inject an electrical current through one or more electrode buttons of the array of electrode buttons into the formation. The processor is operable to determine a differential voltage between at least two electrode buttons of the array of the electrode buttons, and determine the current through the one or more electrode buttons. The processor is also operable to determine a magnetic susceptibility and a resistivity of the formation based on the differential voltage and the current, respectively, and construct a visual representation of the formation based on the resistivity and the magnetic susceptibility of the formation.

19 Claims, 6 Drawing Sheets

(56) References Cited

U.S. PATENT DOCUMENTS

| | | | |
|---|---|---|---|
| 3,379,963 | A | 4/1968 | Saurenman |
| 3,379,964 | A | 4/1968 | Segesman |
| 3,579,098 | A | 5/1971 | Mougne |
| 4,251,773 | A | 2/1981 | Cailliau et al. |
| 4,468,623 | A | 8/1984 | Gianzero et al. |
| 4,545,242 | A | 10/1985 | Chan |
| 4,567,759 | A | 2/1986 | Ekstrom et al. |
| 4,692,908 | A | 9/1987 | Ekstrom et al. |
| 4,851,781 | A | 7/1989 | Marzetta et al. |
| 4,862,090 | A | 8/1989 | Vannier et al. |
| 5,008,625 | A | 4/1991 | Chen |
| 5,012,193 | A | 4/1991 | Chen |
| 5,038,378 | A | 8/1991 | Chen |
| 6,191,588 | B1 | 2/2001 | Chen |
| 7,541,813 | B2 | 6/2009 | Synder, Jr. et al. |
| 7,876,102 | B2 | 1/2011 | Gold et al. |
| RE42,493 | E | 6/2011 | Tabarovsky et al. |
| 8,174,266 | B2 | 5/2012 | Gold et al. |
| 8,579,037 | B2 | 11/2013 | Jacob |
| 9,115,555 | B2 * | 8/2015 | McMillon ............... E21B 23/01 |
| 2003/0197510 | A1 * | 10/2003 | Gianzero ................. G01V 3/20 324/367 |
| 2016/0091627 | A1 | 3/2016 | Donderici et al. |

FOREIGN PATENT DOCUMENTS

| | | |
|---|---|---|
| GB | 1273649 A | 5/1972 |
| RU | 85684 U1 | 8/2009 |
| WO | 9319388 A1 | 9/1993 |
| WO | WO021253 A1 * | 1/2002 ............... G01V 1/32 |
| WO | 2009014882 A2 | 1/2009 |
| WO | 2019177588 | 9/2019 |

OTHER PUBLICATIONS

International Search Report and Written Opinion dated Dec. 17, 2018; International PCT Application No. PCT/US2018/022130.

Davies, D. H., et al. "Azimuthal resistivity imaging: A new generation laterolog." SPE Formation Evaluation 9.03 (1994): 165-174.

Safinya, K. A., et al. "Improved formation imaging with extended microelectrical arrays." SPE Annual Technical Conference and Exhibition. OnePetro, 1991.

Suau, J., et al. "The Dual Laterolog-R, tool." SPE-40 18 (1972).

La Vigne, Jack, Thomas D. Barber, and Tom Bratton. "Strange invasion profiles: what multiarray induction logs can tell us about how oil-based mud affects the invasion process and wellbore stability," SPWLA 38th Annual Logging Symposium. OnePetro, 1997.

Smits, J. W., et al. "High resolution from a new laterolog with azimuthal imaging." SPE Annual Technical Conference and Exhibition. Society of Petroleum Engineers, 1995.

Chen, Y. H., W. C. Chew, and G. J. Zhang, "A novel array laterolog method: The Log Analyst." (1998): 22-33.

Guner, Baris, et al. "Quantitative Demonstration of a High-Fidelity Oil-Based Mud Resistivity Imager Using a Controlled Experiment." SPWLA 61st Annual Logging Symposium-Online. Society of Petrophysicists and Well-Log Analysts, 2020.

* cited by examiner

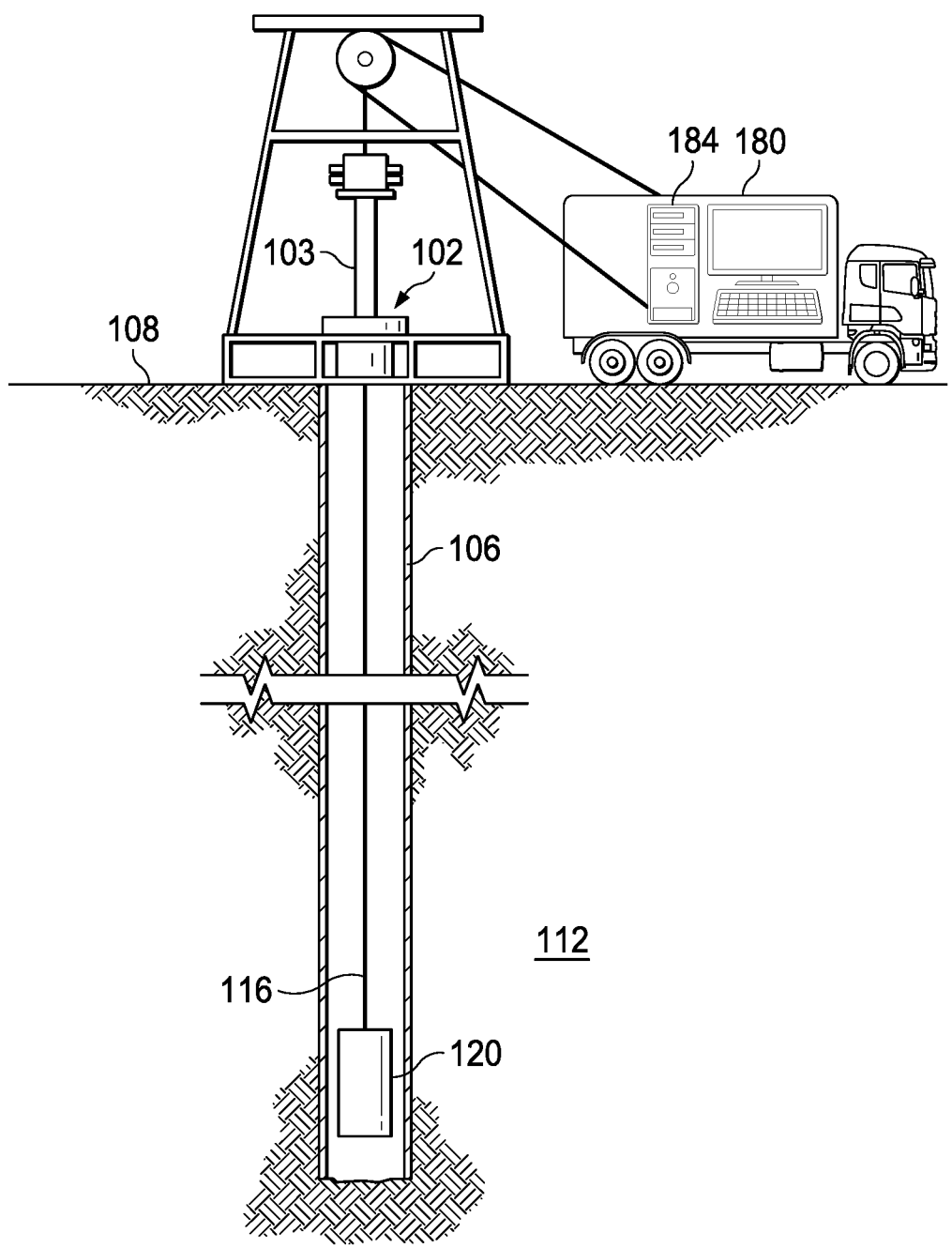

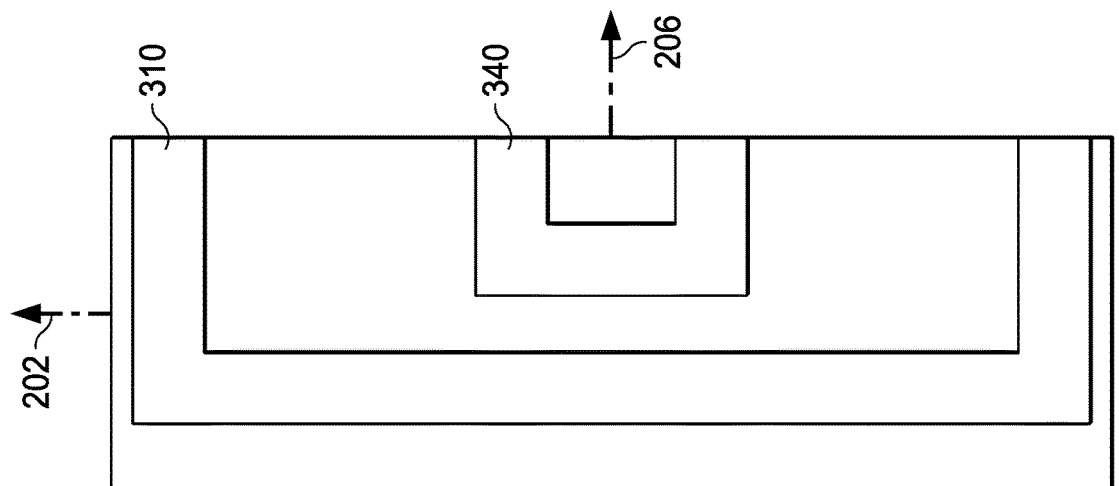
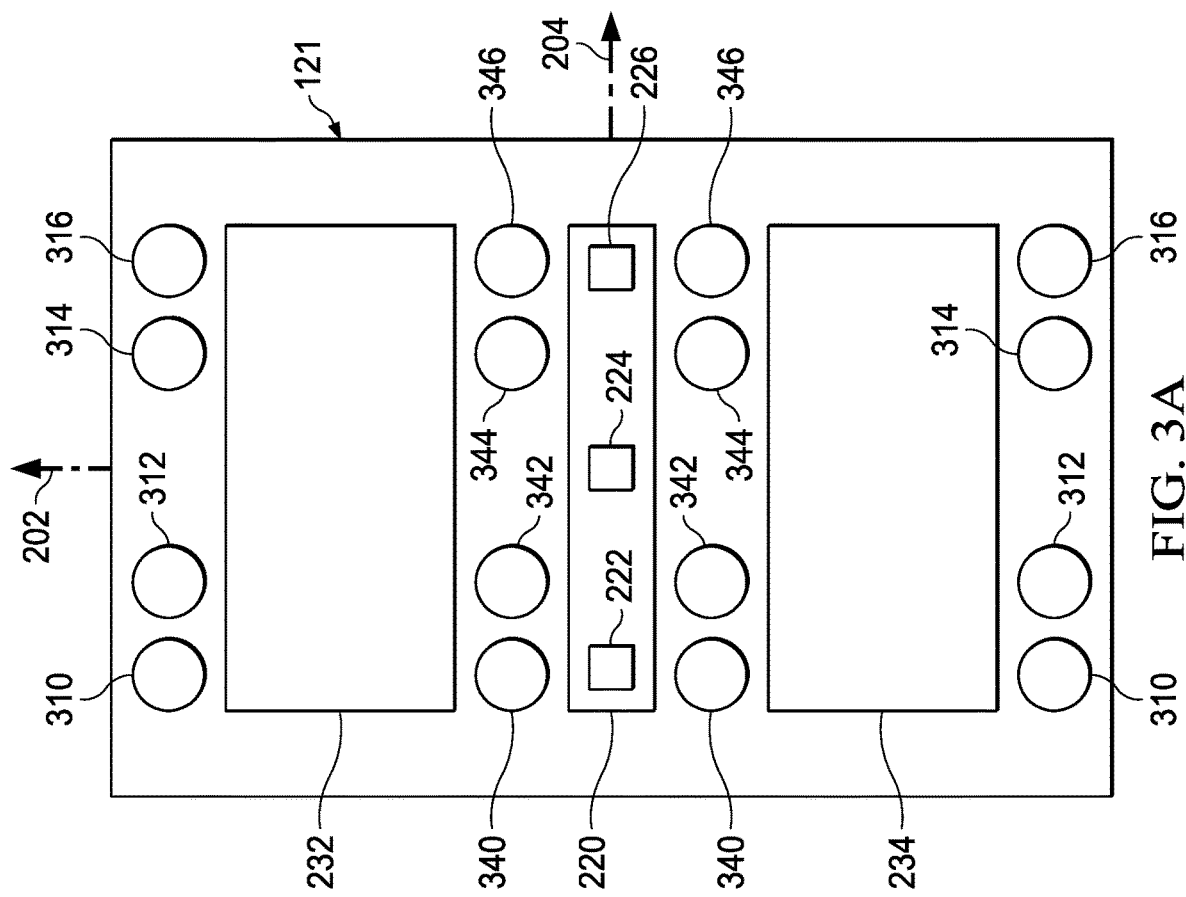

BOREHOLE IMAGING TOOL

BACKGROUND

The present disclosure relates generally to borehole imaging tools, borehole imaging systems, and methods to generate images of a formation proximate a borehole.

Borehole imaging tools are sometimes deployed in downhole environments to measure material properties of a formation along the borehole. These measurements are often interpreted to determine a lithology of the formation, such as, but not limited to the composition of the formation, physical characteristics of one or more types of rocks of the formation, mineralogy of the one or more types of rocks, as well as other properties of the rocks of the formation. Borehole imaging tools sometimes employ resistivity-based measurements to measure electrical properties of the formation along the borehole. However, it may be difficult for resistivity-based imaging tools to differentiate different types of rocks of the formation that have similar resistivity.

BRIEF DESCRIPTION OF THE DRAWINGS

Illustrative embodiments of the present disclosure are described in detail below with reference to the attached drawing figures, which are incorporated by reference herein, and wherein:

FIG. 1A is a schematic, side view of a logging environment with a borehole imaging tool deployed in a borehole to measure resistive and magnetic properties of a formation surrounding the borehole;

FIG. 3A is a schematic, front view of the borehole imaging tool of FIG. 1B;

FIG. 3B is a schematic, side view of the borehole imaging tool of FIG. 1B; and

Figure 1B:
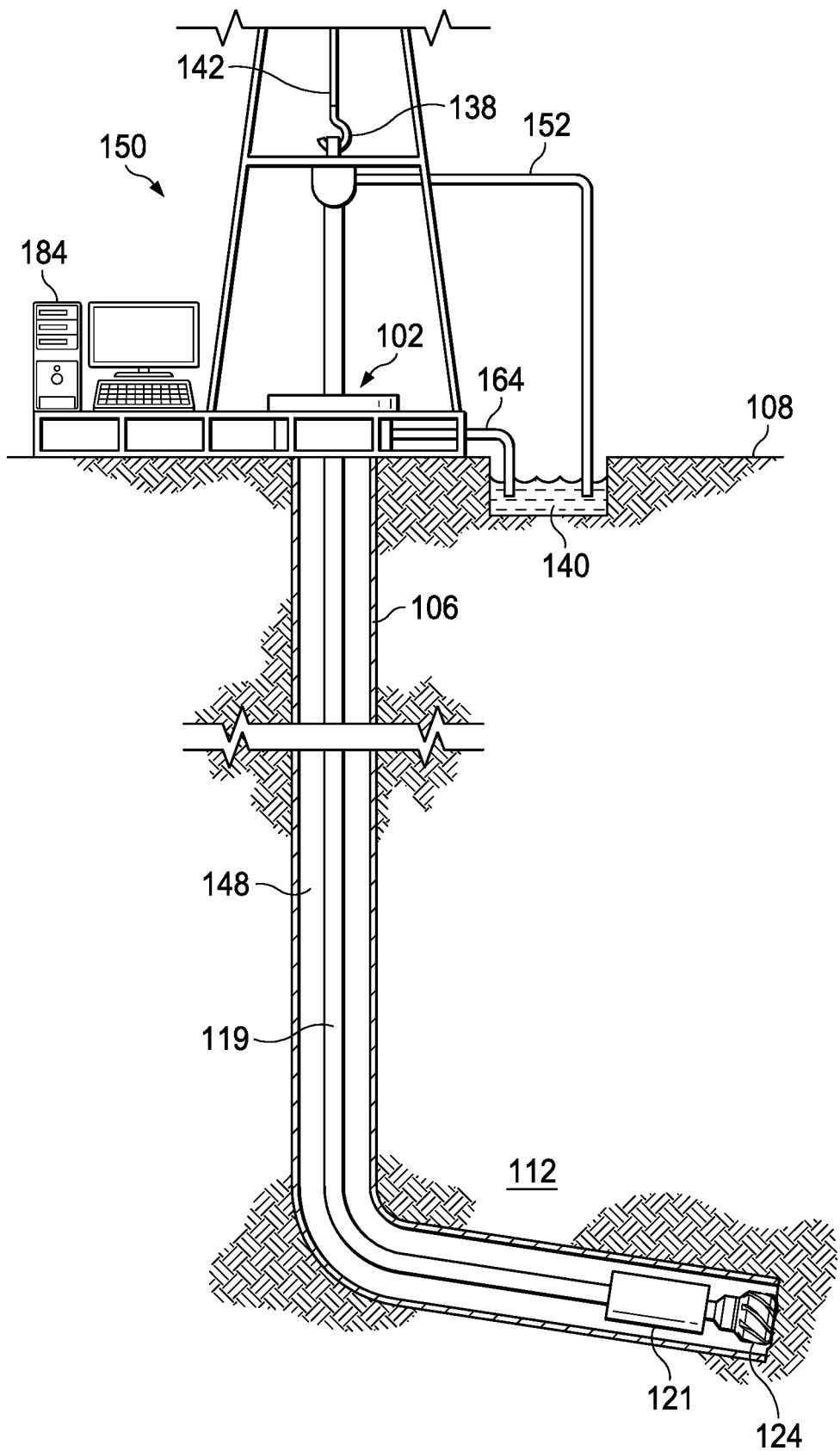
FIG. 1B is a schematic, side view of a logging while drilling (LWD)/measurement while drilling (MWD) environment with another borehole imaging tool deployed to measure the properties of the formation during a drilling operation.

The illustrated figures are only exemplary and are not intended to assert or imply any limitation with regard to the environment, architecture, design, or process in which different embodiments may be implemented.

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to borehole imaging tools, borehole imaging systems, and methods to generate visual representations of a formation. More particularly, the present disclosure relates to a borehole imaging tool having a resistive imaging component operable to measure the resistivity of a formation proximate the borehole imaging tool and also having a magnetic imaging component operable to measure the magnetic susceptibility of the formation. The borehole imaging tool is also operable to generate visual representations of the formation based on the resistivity and magnetic susceptibility measurements. The borehole imaging tool includes a magnetic imaging component, a resistivity imaging component, and an array of button electrodes operable to detect the magnetic susceptibility and the resistivity of the formation at the array of button electrodes.

The magnetic imaging component includes a magnetic field source that is constructed from coils, permanent magnets, solenoids, or other materials operable to induce an alternating magnetic field to flow from the magnetic field source into the formation. The induced alternating magnetic field in turn generates an induced electric field. The induced alternating magnetic field and the induced electric field are detected by different electrode buttons (such as a first electrode button and a second electrode button) of the array of electrode buttons. In some embodiments, where the magnetic field source is formed from multiple coils, the coils are axially symmetrically deployed on the borehole imaging tool. In such embodiments, the electrode buttons are placed along an axis of symmetry of the coils.

A differential voltage at the first electrode button and the second electrode button is calculated based on differences between the induced alternating magnetic field and the induced electric field detected at the first electrode button and the induced alternating magnetic field and the induced electric field detected at the second electrode button. The magnetic susceptibility of the formation is then calculated based on the differential voltage between the first electrode button and the second electrode button. In some embodiments, the magnetic imaging component operates at various frequencies within a range of frequencies (for example, between 100 Hz and 100,000 Hz). In some embodiments, the magnetic imaging component is further operable to eliminate a resistivity effect in the magnetic susceptibility based on measurements indicative of the magnetic susceptibility at multiple frequencies. In one of such embodiments, the magnetic imaging component utilizes a model containing a Maxwell equation that expresses the electrical permittivity and the magnetic permeability as being mutually coupled. Moreover, the magnetic imaging component applies multi-frequency data to the model to eliminate the resistivity effect in the magnetic susceptibility. In such embodiments, the magnetic imaging component is operable to measure the differential voltage at a plurality of frequencies. In one of such embodiments, the magnetic imaging component is operable to separate the differential voltage into a real component and an imaginary component. In such embodiments, the magnetic imaging component is also operable to determine the differential voltage of the real component as well as the differential voltage of the imaginary component of the differential voltage at different frequencies. For example, the magnetic imaging component, upon determining a real component of multiple voltage measurements made at different frequencies, determines a difference (first difference) between the real component of the plurality of the voltage measurements at two different frequencies. The magnetic imaging component also determines an imaginary component of the plurality of the voltage measurements. The magnetic imaging component then determines a difference (second difference) between the imaginary component of the plurality of voltage measurements at the two different frequencies. The magnetic imaging component then estimates the resistivity of the formation based on the first difference and the second difference. Additional examples of operations performed by the magnetic imaging component to determine the real and imaginary components of differential voltage at different frequencies and to estimate the resistivity of the formation are provided in the paragraphs below and are illustrated in at least Tables 1-3.

In some embodiments, the resistivity imaging tool includes multiple magnetometers, where each magnetometer of the multiple magnetometer is collocated with a different electrode button of the array of electrode buttons. In such embodiments, each of the magnetometers is operable to estimate the magnetic permeability of the formation proximate the electrode button of the array of electrode buttons that is collocated with the respective magnetometer. More particularly, the magnetic permeability is defined as $(1+\chi)\mu_0$, where $\chi$ is the magnetic susceptibility and $\mu_0$ is the free space magnetic permeability. Each magnetometer is operable to apply the foregoing equation to calculate the magnetic permeability. In some embodiments, each magnetometer is further operable to determine multiple voltage measurements of the differential voltage at multiple frequencies, and estimate the resistivity and the magnetic susceptibility of the formation based on the multiple voltage measurements of the differential voltage at different frequencies.

In some embodiments, the borehole imaging tool also includes a magnetic field receiver. In some embodiments, the magnetic field source is formed from permanent magnets. In other embodiments, the magnetic field source is formed from solenoids. In one of such embodiments, the magnetic field source forms a C-shape. In some embodiments, the magnetic imaging component is also operable to determine a differential voltage between the magnetic field source and the magnetic field receiver. In such embodiments, the magnetic imaging component is further operable to determine the magnetic susceptibility of the formation based on the induced voltage at the magnetic field receiver.

The resistivity imaging component includes a galvanic source that is operable to inject an electrical current through the array of electrode buttons into the formation. The resistivity imaging component also includes return electrodes operable to receive current returning from the formation. In some embodiments, the resistivity imaging component also includes a guard that is operable to facilitate the flow of the electrical current through the array of electrode buttons. The borehole imaging tool measures the amount of current flowing through the array of electrode buttons and determines the resistivity of the formation based on the amount of current flowing through the array of electrode buttons. In one of such embodiments, each electrode button includes or is coupled to a current measurement component operable to measure current flowing through the respective electrode button. In such embodiments, the resistivity imaging component calculates the impedance of each electrode button by dividing the applied voltage by the current flowing through the respective electrode button. In one of such embodiments, the resistivity imaging component accesses a look-up table to determine the formation resistivity-based on the impedance. In another one of such embodiments, the resistivity imaging component performs an inversion to determine the formation resistivity. In some embodiments, the resistivity imaging component operates at various frequencies within a range of frequencies (for example, between 100 Hz and 100,000 Hz). More particularly, the resistivity imaging component is operable to transmit the current into the formation at different frequencies to perform multi-frequency measurements. In some embodiments, the resistivity imaging component is operable to make multiple measurements of the current flowing through an electrode button at different frequencies, and is operable to estimate the resistivity of the formation based on the measurements of the current flowing through the electrode button at different frequencies.

In some embodiments, both the magnetic imaging component and the resistivity imaging component are operable to simultaneously perform the foregoing operations to determine the magnetic susceptibility and the resistivity of the formation. The borehole imaging tool then constructs a visual representation of the formation based on the resistivity and the magnetic susceptibility of the formation. In some embodiments, the borehole imaging tool determines a lithology of the formation based on the visual representation, where the visual representation is indicative of the magnetic susceptibility and the resistivity of the formation. In some embodiments, the borehole logging tool also generates a logging, completion and/or production-related decision based on the visual representation of the formation. In some embodiments, the borehole imaging tool includes a pad that extends towards a wall of the borehole, where the pad abuts or almost abuts against the borehole. In such embodiments, the array of electrode buttons is deployed on the pad to facilitate transmission of the electrical current to the formation, and also to facilitate detection of the resistivity and magnetic susceptibility of the formation. Similarly, in such embodiments, the magnetic field source (and in some embodiments) the magnetic field receiver also abut or almost abut the wall of the borehole to facilitate measurements of the differential voltage. Additional descriptions of borehole imaging tools, borehole imaging systems, and methods to generate visual representations of formation proximate a borehole are described in the paragraphs below and are illustrated in FIGS. 1-4.

Turning now to the figures, FIG. 1A is a schematic, side view of a logging environment 100 with a borehole imaging tool 120 deployed in a borehole 106 to measure resistive and magnetic properties of a formation 112 surrounding the borehole 106. FIG. 1A may also represent another completion or preparation environment where a logging operation is performed. In the embodiment of FIG. 1A, a well 102 having the borehole 106 extends from a surface 108 of the well 102 to or through a formation 112. A conveyance 116, optionally carried by a vehicle 180, is positioned proximate to the well 102. The conveyance 116 along with the borehole imaging tool 120 are lowered down the borehole 106, i.e. downhole. In one or more embodiments, the conveyance 116 and the borehole imaging tool 120 are lowered downhole through a blowout preventer 103. In one or more embodiments, the conveyance 116 may be wireline, slickline, coiled tubing, drill pipe, production tubing, downhole tractor or another type of conveyance operable to deploy the borehole imaging tool 120. The conveyance 116 provides mechanical suspension of the borehole imaging tool 120 as the borehole imaging tool 120 is deployed downhole. In one or more embodiments, the conveyance 116 also provides power to the borehole imaging tool 120 as well as other downhole components. In one or more embodiments, the conveyance 116 also provides downhole telemetry. Additional descriptions of telemetry are provided in the paragraphs below. In one or more embodiments, the conveyance 116 also provides a combination of power and downhole telemetry to the borehole imaging tool 120. For example, where the conveyance 116 is a wireline, coiled tubing (including electro-coiled-tubing), or drill pipe, power and data are transmitted along the conveyance 116 to the borehole imaging tool 120.

The borehole imagining tool 120 includes an array of electrode buttons that are positioned to face the borehole 106, a magnetic imaging component, and a resistivity imaging component that are operable to obtain measurements indicative of the magnetic susceptibility and the resistivity of the formation 112 proximate the borehole imaging tool 120. Further, the borehole imaging tool 120 is operable to construct a visual representation of the formation 112 based on the resistivity and the magnetic susceptibility of the formation 112. In that regard, the borehole imaging tool 120 includes a processor (not shown) operable to determine the magnetic susceptibility and resistivity of the formation 112 based on the measurements made by the magnetic imaging component and the resistivity imaging component, respectively. The processor is further operable to construct the visual representation. In some embodiments, the processor is a component of a surface based electronic device, such as controller 184. In such embodiments, data obtained by the borehole imaging tool 120 are transmitted to the controller 184 and are processed by the processor of the controller 184. In such embodiments, the foregoing operations of the processor are performed on the surface 108. Additional descriptions of the processor and operations performed by the processor are described in the paragraphs below. In some embodiments, the borehole imaging tool 120 (more specifically, the processor of the borehole imaging tool 120) is operable to obtain an estimate of a lithology of the formation 112 based on the visual representation of the formation 112. Moreover, the borehole imaging tool 120 is also operable to generate at least one of a logging, completion, and production-related decision based on the visual representation of the formation 112. In other embodiments, the estimate of the lithology of the formation 112, as well as logging, completion, and production-related decisions are generated by the controller 184. In one or more embodiments, where the processor is a component of the controller 184, the controller 184 and the borehole imaging tool 120 form a borehole imaging system. In other embodiments, where the processor is a component of another surface based or downhole electronic device, such electronic device and the borehole imaging tool 120 form a borehole imaging system.

In some embodiments, the borehole imaging tool 120 is communicatively connected to the controller 184 via a telemetry system described herein and is operable to provide the visual representation of the formation 112, as well as data indicative of other measurements (such as, but not limited to, an estimate of a lithology of the formation) and analysis (such as proposed logging, completion, and production decisions) performed by the borehole imaging tool 120 to the controller 184. An operator may then access the controller 184 to analyze the visual representation of the formation 112. As defined herein, the controller 184 represents any electronic device operable to receive the visual representation of the formation 112 from the borehole imaging tool 120 and provide the visual representation for display. In some embodiments, the borehole imaging tool 120 is also operable to transmit data indicative of the resistivity and the magnetic susceptibility of the formation 112 to the controller 184. In such embodiments the controller 184 is also operable to construct a visual representation of the formation 112 based on the received data.

FIG. 1B is a schematic, side view of a LWD/MWD environment 150 with another borehole imaging tool 121 deployed to measure the properties of the formation 112 during a drilling operation. FIG. 1B may also represent another completion or preparation environment where a drilling operation is performed. A hook 138, cable 142, traveling block (not shown), and hoist (not shown) are provided to lower a drill sting 119 down the borehole 106 or to lift the drill string 119 up from the borehole 106.

At the wellhead 136, an inlet conduit 152 is coupled to a fluid source (not shown) to provide fluids, such as drilling fluids, downhole. The drill string 119 has an internal cavity that provides a fluid flow path from the surface 108 down to the borehole imaging tool 121. In some embodiments, the fluids travel down the drill string 119, through the borehole imaging tool 121, and exit the drill string 119 at the drill bit 124. The fluids flow back towards the surface 108 through a wellbore annulus 148 and exit the wellbore annulus 148 via an outlet conduit 164 where the fluids are captured in container 140. In LWD systems, sensors or transducers (not shown) are typically located at the lower end of the drill string 119. In one or more embodiments, sensors employed in LWD applications are built into a cylindrical drill collar that is positioned close to the drill bit 124. While drilling is in progress, these sensors continuously or intermittently monitor predetermined drilling parameters and formation data, and transmit the information to a surface detector by one or more telemetry techniques, including, but not limited to mud pulse telemetry, acoustic telemetry, and electromagnetic wave telemetry. In one or more embodiments, where a mud pulse telemetry system is deployed in the borehole 106 to provide telemetry, telemetry information is transmitted by adjusting the timing or frequency of viable pressure pulses in the drilling fluid that is circulated through the drill string 119 during drilling operations. In one or more embodiments, an acoustic telemetry system that transmits data via vibrations in the tubing wall of the drill string 119 is deployed in the borehole 106 to provide telemetry. More particularly, the vibrations are generated by an acoustic transmitter (not shown) mounted on the drill string 119 and propagate along the drill string 119 to an acoustic receiver (not shown) also mounted on the drill string 119. In one or more embodiments, an electromagnetic wave telemetry system that transmits data using current flows induced in the drill string 119 is deployed in the borehole 106 to provide telemetry. Additional types of telemetry systems may also be deployed in the borehole 106 to transmit data from the borehole imaging tool 121 and other downhole components to the controller 184.

The borehole imaging tool 121, similar to the borehole imaging tool 120 shown in FIG. 1A, is also operable to obtain measurements of the resistivity and magnetic susceptibility of the formation 112, generate a visual representation of the formation 112 based on the measurements of the resistivity and the magnetic susceptibility of the formation 112, and provide the visual representation to the controller 184. Additional descriptions of the operations performed by the borehole imaging tools 120 and 121 are provided in the paragraphs below. Further, additional illustrations of the borehole imaging tools 120 and 121 are provided in at least FIGS. 2A, 2B, 3A, and 3B. Although FIGS. 1A and 1B each illustrates a single borehole imaging tool 120 or 121 deployed in the borehole 106, multiple borehole imaging tools, such as the borehole imaging tools 120 and 121 may be simultaneously deployed in the borehole 106 to perform operations described herein.

Figure 2A:
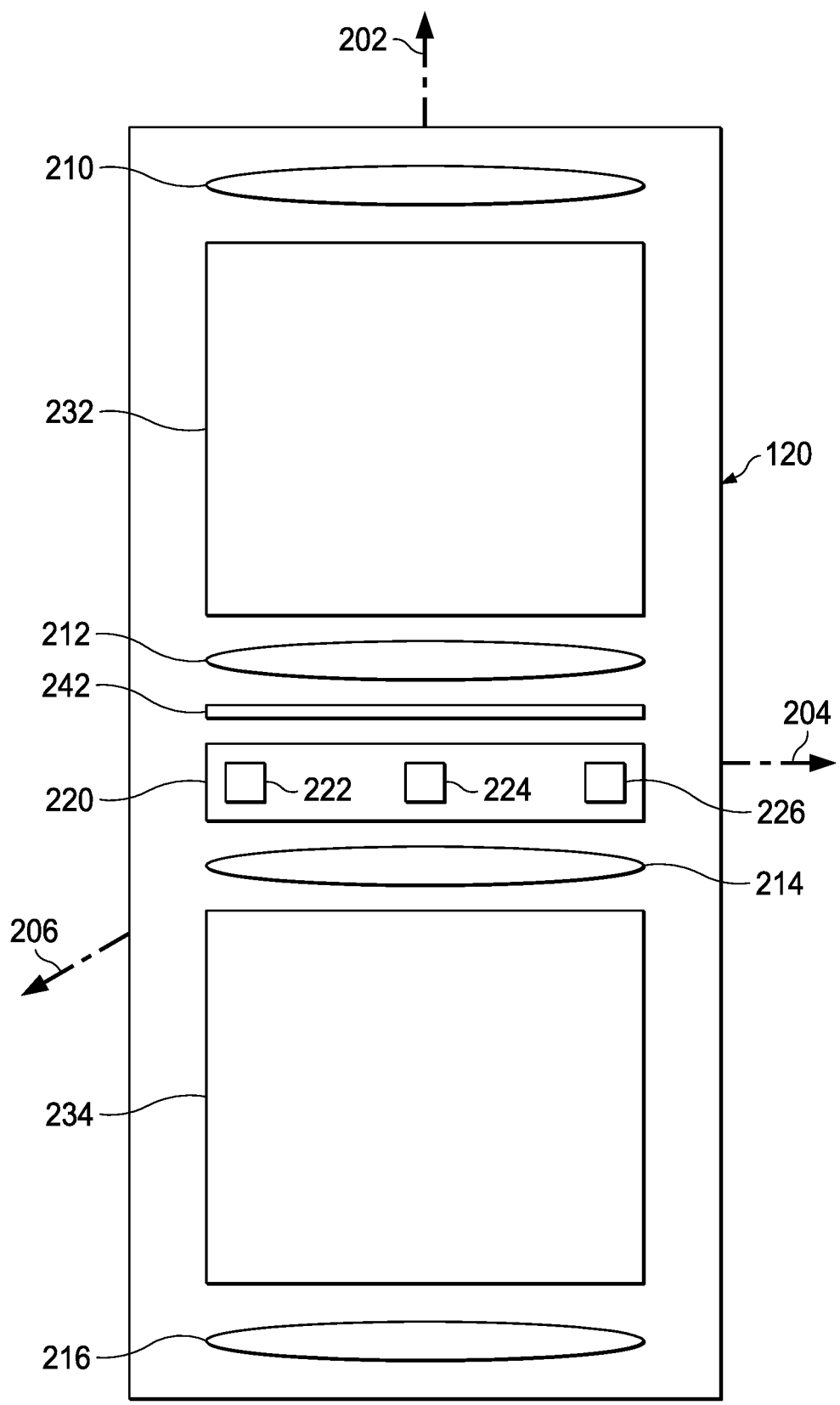
FIG. 2A is a schematic, front view of the borehole imaging tool of FIG. 1A.

FIG. 2A is a schematic, block diagram of a front view of the borehole imaging tool 120 of FIG. 1A. The borehole imaging tool 120 includes an array of electrode buttons, including first electrode button 222, second electrode button 224, and third electrode button 226 that are deployed on a pad (not shown). The borehole imaging tool 120 includes a magnetic imaging component formed from magnetic field sources, including first magnetic field source 210, second magnetic field source 212, third magnetic field source 214, and fourth magnetic field source 216. In some embodiments, the first through fourth magnetic field sources 210, 212, 214, and 216 are formed from one or more coils deployed on the borehole imaging tool 120, such that the coils are axially symmetrically wrapped around the borehole imaging tool 120. In other embodiments, the first through fourth magnetic field sources 210, 212, 214, and 216 are formed from permanent magnets. In further embodiments, the magnetic field sources are formed from solenoids. The first through fourth magnetic field sources 210, 212, 214, and 216 are operable to induce an alternating magnet field into the formation. In one of such embodiments, the alternating magnetic field traverses the formation 112 along a direction parallel to Z-axis 202. The alternating magnetic field that flows into the formation 112 in turn induces an electric field. In some embodiments, the induced electric field travels in along a direction parallel to X-axis 206. The alternating magnetic field and the induced electric field are measured by each of the first, second, and third electrode buttons 222, 224, and 226.

The borehole imaging tool includes a processor (not shown) that calculates a differential voltage between two different electrode buttons (such as between the first electrode button 222 and the second electrode button 224) based on differences between the induced alternating magnetic field and the induced electric field detected at the first and second electrode buttons. Further, the processor calculates the magnetic susceptibility of the formation based on the differential voltage between the first and second electrode buttons 222 and 224. In some embodiments, the magnetic imaging component also includes one or more magnetometers (not shown) that are collocated with the first, second, and third electrode buttons 222, 224, and 226. In such embodiments, each of the magnetometers is operable to estimate a magnetic permeability of the formation 112 proximate an electrode button 222, 224, or 226 that is collocated with the respective magnetometer.

In some embodiments, the magnetic imaging component operates at different frequencies within a range of frequencies to produce different alternating magnetic field and the induced electric field measurements, and evaluates the differences in the alternating magnetic field and the induced electric field to determine the magnetic susceptibility of the formation 112. Table 1 is an example of measurements made by the first electrode button 222 of the induced electric field due to excitation of the first and the fourth magnetic field sources 210 and 216, where the frequency column represents different frequencies at which the magnetic imaging component operates, resistivity represents the resistivity of the formation 112, and permeability represents the magnetic permeability of the formation 112. Further, $Re[E_\phi]$ represents the value of the real component of the induced electric field in a phi $\phi$ direction that is parallel to the Y-axis 204, and $Im[E_\phi]$ represents the value of the imaginary component of the induced electric field in the phi $\phi$ direction.

TABLE 1

| Frequency (Hz) | Resistivity (ohmm) | Permeability | $Re[E_\phi]$ (V/m) | $Im[E_\phi]$ (V/m) |
|---|---|---|---|---|
| 100 | 0.2 | 1 | −9.8264E−09 | −2.9787E−04 |
| 100 | 0.2 | 1.01 | −1.0024E−08 | −3.0085E−04 |
| 100 | 1 | 1 | −1.9695E−09 | −2.9787E−04 |
| 100 | 1 | 1.01 | −2.0090E−09 | −3.0085E−04 |
| 1000 | 0.2 | 1 | −9.7446E−07 | −2.9787E−03 |
| 1000 | 0.2 | 1.01 | −9.9398E−07 | −3.0084E−03 |
| 1000 | 1 | 1 | −1.9621E−07 | −2.9787E−03 |
| 1000 | 1 | 1.01 | −2.0015E−07 | −3.0085E−03 |
| 10000 | 0.2 | 1 | −9.4861E−05 | −2.9783E−02 |
| 10000 | 0.2 | 1.01 | −9.6748E−05 | −3.0081E−02 |
| 10000 | 1 | 1 | −1.9390E−05 | −2.9786E−02 |
| 10000 | 1 | 1.01 | −1.9778E−05 | −3.0084E−02 |
| 100000 | 0.2 | 1 | −8.6749E−03 | −2.9683E−01 |
| 100000 | 0.2 | 1.01 | −8.8433E−03 | −2.9978E−01 |
| 100000 | 1 | 1 | −1.8659E−03 | −2.9777E−01 |
| 100000 | 1 | 1.01 | −1.9029E−03 | −3.0074E−01 |

As shown in Table 1, both the real and imaginary component of the electric field in the phi $\phi$ direction are sensitive to the frequency of the magnetic imaging component, the resistivity of the formation 112, and the permeability of the formation 112. As shown in Table 1, the $Im[E_\phi]$ has little sensitivity to the formation resistivity. However, the $Im[E_\phi]$ is sensitive to the formation permeability and varies with the same order of magnitude. In one of such embodiments, the formation permeability and susceptibility may be estimated by applying the $Im[E_\phi]$ in a look-up table. In another one of such embodiments, an inversion process may be performed to determine the formation permeability and susceptibility.

Table 2 is an example of measurements made by the first electrode button 222 of a component of the magnetic field orientated along the Z-axis 202 due to excitation of the first and the fourth magnetic field sources 210 and 216, where the frequency column represents different frequencies at which the magnetic imaging component operates, resistivity represents the resistivity of the formation 112, permeability represents the magnetic permeability of the formation 112, Re[Hz] represents the value of the real component of the alternating magnetic field, and Im[Hz] represents the value of the imaginary component of the alternating magnetic field.

TABLE 2

| Frequency (Hz) | Resistivity (ohmm) | Permeability | Re[Hz] (A/m) | Im[Hz] (A/m) |
|---|---|---|---|---|
| 100 | 0.2 | 1 | 2.7970E+01 | −9.6044E−04 |
| 100 | 0.2 | 1.01 | 2.7970E+01 | −9.7003E−04 |
| 100 | 1 | 1 | 2.7970E+01 | −1.9251E−04 |
| 100 | 1 | 1.01 | 2.7970E+01 | −1.9443E−04 |
| 1000 | 0.2 | 1 | 2.7969E+01 | −9.5229E−03 |
| 1000 | 0.2 | 1.01 | 2.7969E+01 | −9.6175E−03 |
| 1000 | 1 | 1 | 2.7970E+01 | −1.9178E−03 |
| 1000 | 1 | 1.01 | 2.7970E+01 | −1.9369E−03 |
| 10000 | 0.2 | 1 | 2.7966E+01 | −9.2652E−02 |
| 10000 | 0.2 | 1.01 | 2.7966E+01 | −9.3560E−02 |
| 10000 | 1 | 1 | 2.7969E+01 | −1.8947E−02 |
| 10000 | 1 | 1.01 | 2.7969E+01 | −1.9135E−02 |
| 100000 | 0.2 | 1 | 2.7866E+01 | −8.4569E−01 |
| 100000 | 0.2 | 1.01 | 2.7865E+01 | −8.5356E−01 |
| 100000 | 1 | 1 | 2.7960E+01 | −1.8219E−01 |
| 100000 | 1 | 1.01 | 2.7959E+01 | −1.8396E−01 |

As shown in Table 2, both the real (Re[Hz]) and imaginary (Im[Hz]) components of the alternating magnetic field orientated along the Z-axis 202 are sensitive to the frequency of the magnetic imaging component, the resistivity of the formation 112, and the permeability of the formation 112. In such embodiments, Re[Hz] has limited or almost no sensitivity to both formation resistivity and permeability. However, Im[Hz] is influenced by both formation resistivity and permeability. In such embodiments, the resistivity of the formation 112 is utilized to determine the formation permeability and susceptibility from the Im[Hz]. As shown in Tables 1 and 2, the imaginary part of the induced electric field in Table 1 is only sensitive to the changes of magnetic permeability and varies with the same order of magnitude. On the other hand, the induced magnetic field that is tabulated in Table 2 is sensitive to both resistivity and magnetic permeability. As such, a multi-frequency measurement of the resistivity of the formation 112 is obtained to determine the magnetic susceptibility.

The borehole imaging tool 120 also includes a resistivity imaging component. The resistivity component includes a galvanic source (not shown) that is electrically coupled to each of the electrode buttons 222, 224, and 226. Moreover, the galvanic source is operable to inject an electrical current into the formation 112 in a direction parallel to the X-axis 206. The resistivity imaging component also includes a guard 220 that facilitates the flow of the electrical current through the first, second, and third electrode buttons 222, 224, and 226. The resistivity imaging component further includes first and second return electrodes 232 and 234. The resistivity imaging component measures the current as it flows through the first, second, or third electrode buttons 222, 224, and 226, and determines the resistivity of the formation 112 based on the current flowing through the first, second, or third electrode buttons 222, 224, or 226. In the depicted embodiment, the resistivity imaging component determines the resistivity of the formation 112 based on the current that flows through the first, second, or third electrode buttons 222, 224, or 226, into the formation 112, and returns to first or second return electrodes 232 or 234.

In some embodiments, the magnetic imaging component and the resistivity imaging component of the borehole imaging tool 120 are operable to simultaneously determine the magnetic susceptibility and the resistivity of the formation 112. The borehole imaging tool 120 (more particularly, the processor of the borehole imaging tool 120), upon determining both the magnetic susceptibility and the resistivity of the formation 112, constructs a visual representation of the formation 112 based on the resistivity and the magnetic susceptibility. Although FIG. 2A illustrates four magnetic field sources 210, 212, 214, and 216, a different number of magnetic field sources may be deployed on the borehole imaging tool 120. Similarly, although FIG. 2A illustrates three electrode buttons 222, 224, and 226, a different number of electrode buttons may be deployed on the borehole imaging tool 120. Further, in some embodiments, the magnetic imaging component also includes one or more magnetic field receivers (not shown) that are deployed on the borehole imaging tool 120. In some embodiments, where both the magnetic field sources and the magnetic field receivers are deployed on the borehole imaging tool 120, measurements indicative of the magnetic susceptibility of the formation 112 are measured at the magnetic field receivers.

Figure 2B:
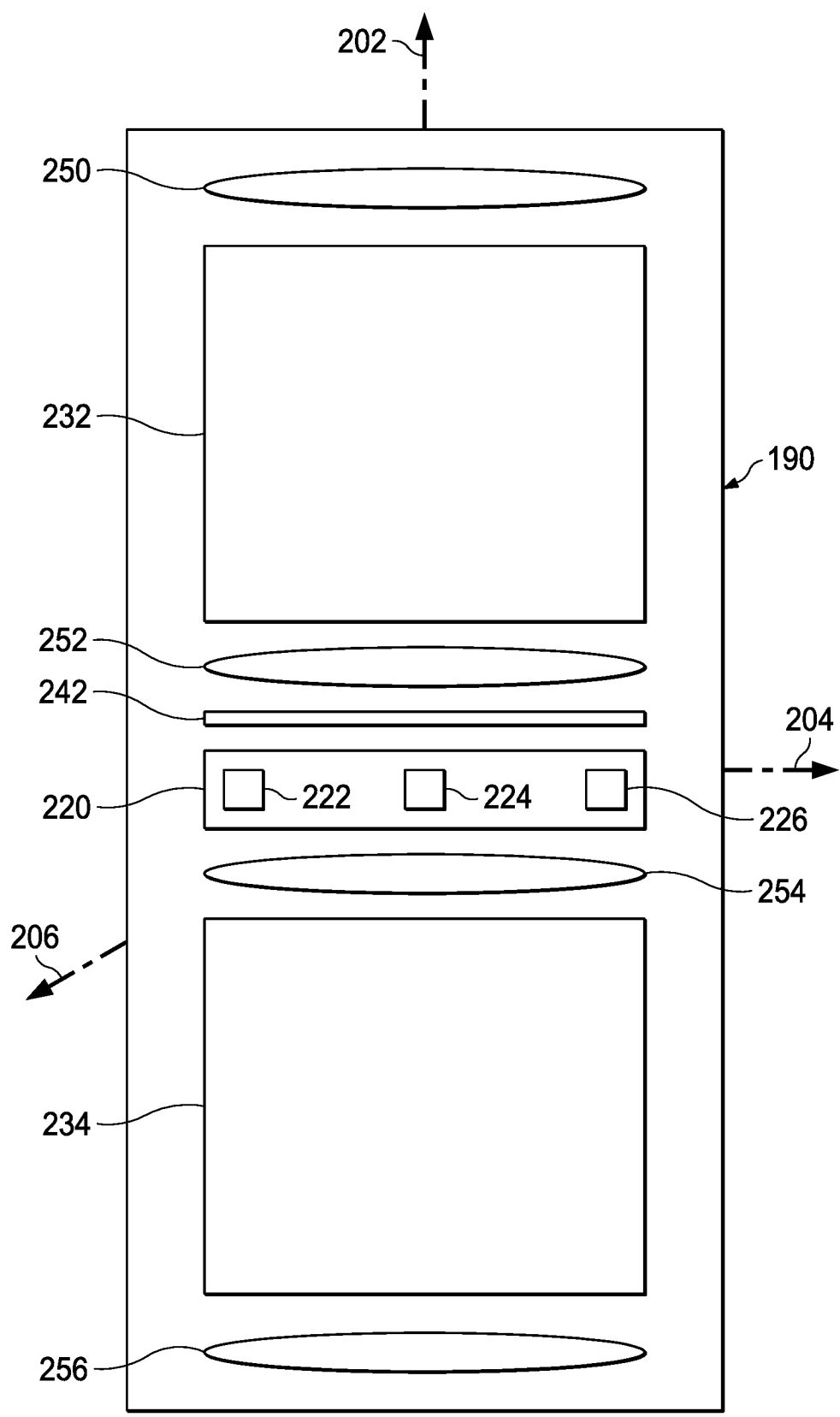
FIG. 2B is a schematic, front view of another borehole imaging tool, similar to the borehole imaging tool of FIG. 1A.

As described herein, and in some embodiments, the magnetic field sources are formed from coils (such as coils 210, 212, 214, and 216). In certain embodiments, some of the coils 210, 212, 214, and 216 are utilized as transmitter coils and other coils are utilized as receiver coils. FIG. 2B is a schematic, front view of another borehole imaging tool 190 that is similar to the borehole imaging tool 120. The borehole imaging tool 190 and the borehole imaging tool 120 contain almost identical components, which are described in the foregoing paragraphs. However, in the embodiment of FIG. 2B, coils 250 and 256 are utilized as a transmitter coils, whereas coils 252 and 254 are utilized as receiver coils. In such embodiments, the magnetic imaging component excites a transmitter coil (such as, for example, coil 250) to induce an alternating magnetic field into the formation 112. The alternating magnetic field in turn induces an electric field. The induced electric field in turn excites receiver coil 256, thereby inducing a voltage at the receiver coil 256 (which is the differential voltage between the transmitter coil 250 and the receiver coil 256). The magnetic imaging component (the processor) determines the differential voltage at the receiver coil 256 and determines the magnetic susceptibility of the formation 112 based on the differential voltage.

Table 3 is an example of measurements of real and imaginary components of the differential voltage at coil 254, where the frequency column represents different frequencies at which the magnetic imaging component operates, resistivity represents the resistivity of the formation 112, permeability represents the magnetic permeability of the formation 112, Re[V] represents the value of the real component of the differential voltage, and Im[V] represents the value of the imaginary component of the differential voltage.

TABLE 3

| Frequency (Hz) | Resistivity (ohmm) | Permeability | Re[V] (V) | Im[V] (V) |
|---|---|---|---|---|
| 100 | 0.2 | 1 | 3.23231e−07 | 1.65226e−01 |
| 100 | 0.2 | 1.01 | 3.29727e−07 | 1.66878e−01 |
| 100 | 1 | 1 | 6.46796e−08 | 1.65226e−01 |
| 100 | 1 | 1.01 | 6.59796e−08 | 1.66878e−01 |
| 1000 | 0.2 | 1 | 3.22579e−05 | 1.65226e+00 |
| 1000 | 0.2 | 1.01 | 3.29058e−05 | 1.66878e+00 |
| 1000 | 1 | 1 | 6.46213e−06 | 1.65226e+00 |
| 1000 | 1 | 1.01 | 6.59197e−06 | 1.66878e+00 |
| 10000 | 0.2 | 1 | 3.20515e−03 | 1.65226e+01 |
| 10000 | 0.2 | 1.01 | 3.26942e−03 | 1.66878e+01 |
| 10000 | 1 | 1 | 6.44367e−04 | 1.65226e+01 |
| 10000 | 1 | 1.01 | 6.57305e−04 | 1.66878e+01 |
| 100000 | 0.2 | 1 | 3.13992e−01 | 1.65217e+02 |
| 100000 | 0.2 | 1.01 | 3.20255e−01 | 1.66869e+02 |
| 100000 | 1 | 1 | 6.38530e−02 | 1.65225e+02 |
| 100000 | 1 | 1.01 | 6.51321e−02 | 1.66877e+02 |

As shown in Table 3, the imaginary part of the differential voltage Im[V] at coil 254 is sensitive only to magnetic permeability at 100 Hz but may be influenced by the changes of resistivity at higher frequencies. The results shown in Table 3 illustrate the sensitivity of the borehole imaging tool 190 by using coil 252 as transmitting antenna and coil 254 as receiving antenna.

FIG. 3A is a schematic, front view of the borehole imaging tool 121 of FIG. 1B. FIG. 3B is a schematic, side view of the borehole imaging tool 121 of FIG. 1B. In the depicted embodiment of FIGS. 3A and 3B, the borehole imaging tool 121 includes four outer magnetic field sources 310, 312, 314, and 316 and four inner four magnetic field sources 340, 342, 344, and 346. In the depicted embodiment, the outer magnetic field sources 310, 312, 314, and 316 and the inner magnetic field sources 340, 342, 344, and 346 are formed from permanent magnets and from solenoids, respectively. As depicted in FIG. 3B, the outer and inner magnetic sources form C-shapes along a plane formed by the X-axis 206 and the Z axis 202. In such embodiments, any of the four outer magnetic field source 310, 312, 314, and 316 or the four inner magnetic field sources 340, 342, 344, and 346 operates as a transmitting antenna. Although the embodiment depicted in FIGS. 3A and 3B illustrate four outer magnetic field sources and four inner magnetic field sources, the borehole imaging tool 121 may be fitted with a different number of outer and inner magnetic field sources to perform operations described herein.

The borehole imaging tool 121 also includes a resistivity imaging component similar to the resistivity imaging component of the borehole imaging tool 120 and operable to determine the resistivity of the formation 112. Further, the borehole imaging tool 121 (the processor), upon determining the magnetic susceptibility and the resistivity of the formation 112, performs operations similar to the operations of the borehole imaging tool 120 to construct the visual representation of the formation 112, determine a lithology of the formation based on the visual representation, and generate logging, completion, and/or production-related decisions based on the visual representation. Although the foregoing paragraphs describe operations performed by the processor of the borehole imaging tool 121, in one or more embodiments, the processor is a component of a surface based electronic device, such as the controller 184. In such embodiments, data indicative of downhole measurements obtained by the borehole imaging tool 121 are transmitted via telemetry to the controller 184. The processor of the controller 184 then performs the foregoing operations based on the data obtained from the borehole imaging tool 121.

Figure 4:
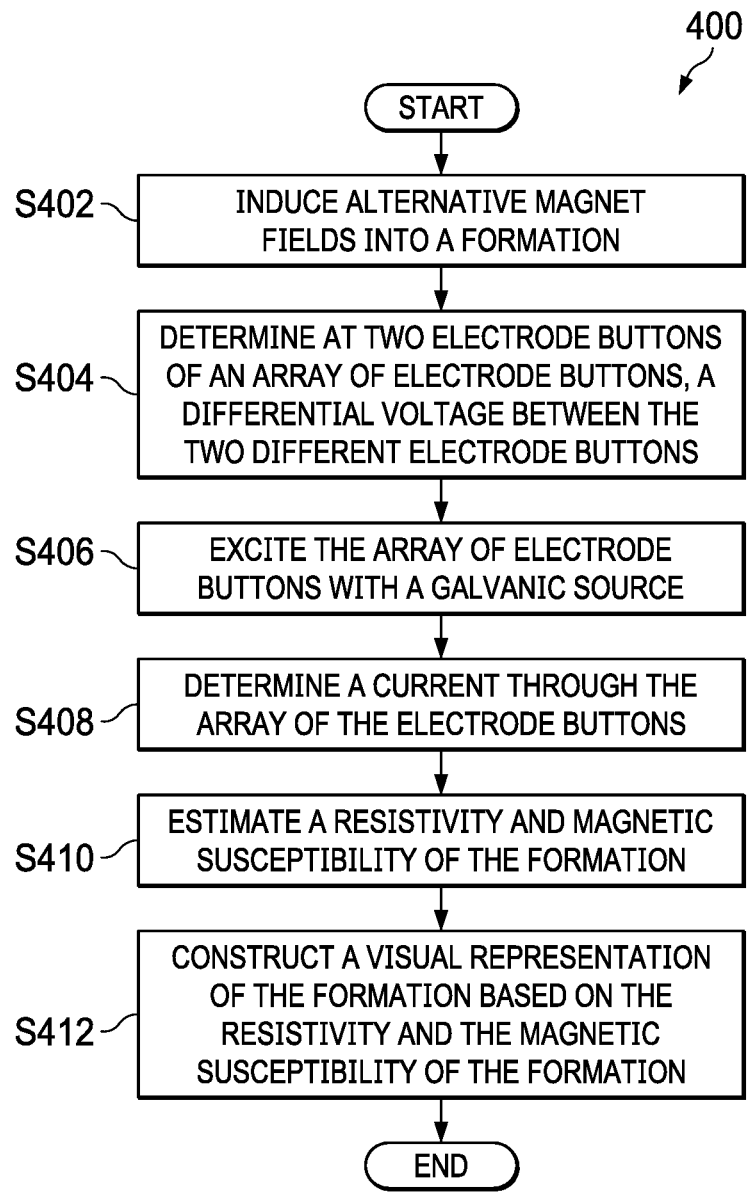
FIG. 4 is a flow chart of a process to generate a visual representation of a formation surrounding the borehole.

FIG. 4 is a flow chart of a process 400 to generate a visual representation of the formation 112 surrounding the borehole 106. Although the operations in the process 400 are shown in a particular sequence, certain operations may be performed in different sequences or at the same time where feasible.

As described herein, the borehole imaging tool 120, 121, or 190 contains an array of electrode buttons, a magnetic imaging component, and a resistivity imaging component. At block S402, the borehole imaging tool 120, 121, or 190 induces an alternating magnetic field into the formation 112. As described herein, the induced alternating magnetic field in turn induces an electric field, which is picked up by the electrode buttons of the borehole imaging tool 120, 121, or 190. At block S404, the borehole imaging tool 120, 121, or 190 determines, at two electrode buttons of an array of electrode buttons, a differential voltage between the two electrode buttons. In some embodiments, the borehole imaging tool 120, 121, or 191 determines a strength of the alternating magnetic field and a strength of the induced electric field at or proximate the two electrode buttons. In one of such embodiments, the borehole imaging tool 120, 121, or 191 determines the differential voltage between the two electrode buttons based on the induced electric field and the alternating magnetic field detected at each of the two electrode buttons. Further, in some embodiments, the borehole imaging tool 120, 121, or 190 operates at different frequencies to obtain the differential voltage at each of the different frequencies. At block S406, the borehole imaging tool 120, 121, or 190 excites the array of electrode buttons with a galvanic source. At block S408, the borehole imaging tool 120, 121, or 190 determines a current through the array of electrode buttons. In some embodiments, the borehole imaging tool 120, 121, or 190 also operates at different frequencies to determine the current at the different frequencies. In some embodiments, the borehole imaging tool 120, 121, or 190 simultaneously performs the operations described in blocks S404 and S408.

At block S410, the borehole imaging tool 120, 121, or 190 estimates, based on the differential voltage between the electrode buttons and the current flowing through the array of electrode buttons, the magnetic susceptibility and the resistivity of the formation 112. Further, in some embodiments, where the borehole imaging tool 120, 121, or 190 obtains the differential voltage at different frequencies, the imaging tool 120, 121, or 190 is further operable to determine, based on the differential voltage, the magnetic susceptibility at each of the different frequencies. In some embodiments, the borehole imaging tool 120, 121, or 190 also utilizes the estimated resistivity and the magnetic susceptibility to calculate or correct the magnetic property. At block S412, the borehole imaging tool 120, 121, or 190 constructs a visual representation of the formation 112 based on the resistivity and the magnetic susceptibility of the formation 112. In some embodiments, the borehole imaging tool 120, 121, or 190 also generates an estimate of a lithology of the formation 112 based on the visual representation. In further embodiments, the borehole imaging tool 120, 121, or 190 also generates suggestions, such as logging, completion, and production-related suggestions based on the visual representation. In one or more embodiments, the operations described in blocks S404, S408, S410, and S412 are performed by a processor of the controller 184 or a processor of another surface based electronic device. In one or more embodiments, the operations are performed by a processor of the downhole imaging tool 120, 121, or 190. In one or more embodiments, the operations are performed by a combination of processors of the downhole imaging tool 120, 121, or 190 and the controller 184.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure:

Clause 1, a borehole imaging system, comprising: a borehole imaging tool comprising: a magnetic field source operable to induce an alternating magnetic field to flow into a formation, the alternating magnetic field in turn inducing an induced electric field; an array of electrode buttons, each electrode button of the array of electrode buttons being operable to detect the induced electric field; a galvanic source operable to inject an electrical current through one or more electrode buttons of the array of electrode buttons into the formation; and a processor operable to: determine a differential voltage between at least two electrode buttons of the array of the electrode buttons; determine the current through the one or more electrode buttons; determine a magnetic susceptibility and a resistivity of the formation based on the differential voltage and the current, respectively, and construct a visual representation of the formation based on the resistivity and the magnetic susceptibility of the formation.

Clause 2, the borehole imaging system of clause 1, wherein the borehole imaging tool further comprises: one or more magnetometers, each of the one or more magnetometers being collocated with a different button of the array of buttons, wherein each of the one or more magnetometers is operable to estimate a magnetic permeability of the formation proximate a button of the array of buttons that is collocated with the respective magnetometer.

Clause 3, the borehole imaging system of clause 1 or 2, wherein the magnetic field source is formed from one or more coils.

Clause 4, the borehole imaging system of any of clauses 1-3, wherein the one or more coils comprise at least two coils, and wherein the at least two coils are axially symmetrically deployed on the borehole imaging system, and wherein the one or more electrode buttons are placed along an axis of symmetry of the one or more coils.

Clause 5, the borehole imaging system of any of clauses 1-4, wherein the magnetic field source comprises one or more permanent magnets.

Clause 6, the borehole imaging system of any of clauses 1-5, wherein the magnetic field source comprises one or more solenoids.

Clause 7, the borehole imaging system of clauses 1-6, wherein the one or more solenoids are C-shaped.

Clause 8, the borehole imaging system of any of clauses 1-7, wherein the borehole imaging tool further comprises a pad that extends towards a wall of the borehole, wherein the array of electrode buttons is positioned on the pad.

Clause 9, the borehole imaging system of clauses 1-8, wherein the borehole imaging tool further comprises a magnetic field receiver, and the processor is further operable to determine an induced voltage at the magnetic field receiver, the induced voltage being a differential voltage between the magnetic field source and the magnetic field receiver; and determine the magnetic susceptibility of the formation based on the induced voltage at the magnetic field receiver.

Clause 10, the borehole imaging system of any of clauses 1-9, wherein the processor is further operable to determine the differential voltage based on the induced electric field and the alternating magnetic field detected at each of the two electrode buttons.

Clause 11, a method to generate a visual representation of a formation, comprising: inducing alternating magnetic field into a formation, the alternating magnetic field in turn inducing an induced electric field; determining, at two electrode buttons of an array of electrode buttons, a differential voltage between the two electrode buttons; exciting the array of electrode buttons with a galvanic source; determining a current through the array of electrode buttons; estimating, based on the differential voltage between the electrode buttons and the current flowing through the array of electrode buttons, a resistivity and magnetic susceptibility of the formation proximate the array of buttons; and constructing a visual representation of the formation based on the resistivity and magnetic susceptibility of the formation.

Clause 12, the method of claim 11, further comprising obtaining an estimate of a lithology of the formation based on the visual representation of the formation.

Clause 13, the method of clause 11 or 12, further comprising generating at least one of a logging, completion, and production-related decision based on the visual representation of the formation.

Clause 14, the method of any one of clauses 11-13, further comprising determining, at the two electrode buttons, a strength of the alternating magnetic field and a strength of the induced electric field proximate the two electrode buttons, wherein determining the differential voltage between the different electrode buttons comprises determining the differential voltage based on the strength of the alternating magnetic field and the strength of the induced electric field proximate the two electrode buttons.

Clause 15, the method of any of clauses 11-14, further comprising eliminating a resistivity effect in the magnetic susceptibility based on at least one of measurements indicative of the magnetic susceptibility at multiple frequencies and measurements indicative of the resistivity at multiple frequencies.

Clause 16, the method of any of clauses 11-15, wherein determining the differential voltage comprises determining a plurality of voltage measurements of the differential voltage at a plurality of frequencies, and estimating the resistivity and the magnetic susceptibility of the formation comprises estimating the magnetic susceptibility of the formation based on the plurality of voltage measurements of the differential voltage at the plurality of frequencies.

Clause 17, the method of clauses 11-16, further comprising: determining a real component of the plurality of the voltage measurements; determining a first difference between the real component of the plurality of the voltage measurements at two different frequencies of the plurality of frequencies; determining an imaginary component of the plurality of the voltage measurements; and determining a second difference between the imaginary component of the plurality of voltage measurements at the two different frequencies, wherein estimating the resistivity of the formation is based on the first difference and the second difference.

Clause 18, the method of any of clauses 11-17, wherein determining the current through the array of the electrode buttons comprises determining a plurality of current measurements of the current at a plurality of frequencies, and wherein estimating the resistivity and the magnetic susceptibility of the formation comprises estimating the resistivity of the formation based on the plurality of current measurements of the current measurements of the current at the plurality of frequencies.

Clause 19, the method of any of clauses 11-18, wherein inducing the alternating magnetic field and exciting the array of the electrode buttons comprises simultaneously inducing the alternating magnetic field and exciting the array of the electrode buttons.

Clause 20, a borehole imaging tool, comprising: a pad; one or more coils axially symmetrically deployed on the pad; an array of electrode buttons deployed on the pad, wherein one or more electrode buttons of the array of electrode buttons are placed along an axis of symmetry of the one or more coils, and wherein each electrode button of the array of electrode buttons being operable to detect the induced electric field; one or more magnetometers, each of the one or more magnetometers being collocated with a different button of the array of buttons; a galvanic source operable to inject an electrical current through one or more electrode buttons of the array of electrode buttons into the formation; and at least one return electrode operable to receive the current.

Although certain embodiments disclosed herein describes transmitting electrical currents from electrodes deployed on an inner string to electrodes deployed on an outer string, one of ordinary skill would understand that the subject technology disclosed herein may also be implemented to transmit electrical currents from electrodes deployed on the outer string to electrodes deployed on the inner string.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

What is claimed is:

1. A borehole imaging system, comprising:
a borehole imaging tool, the tool comprising:
a magnetic field source formed from one or more coils wrapped around the borehole imaging tool, the magnetic field operable to induce an alternating magnetic field to flow into a formation, the alternating magnetic field in turn inducing an induced electric field;
an array of electrode buttons, each electrode button of the array of electrode buttons being operable to detect the induced electric field;
a galvanic source operable to inject an electrical current through one or more electrode buttons of the array of electrode buttons into the formation; and
a processor operable to:
determine a differential voltage between at least two electrode buttons of the array of the electrode buttons;
determine the current through the one or more electrode buttons;
determine a magnetic susceptibility and a resistivity of the formation based on the differential voltage and the current, respectively, and
construct a visual representation of the formation based on the resistivity and the magnetic susceptibility of the formation.

2. The borehole imaging system of claim 1, wherein the borehole imaging tool further comprises:
one or more magnetometers, each of the one or more magnetometers being collocated with a different button of the array of buttons,
wherein each of the one or more magnetometers is operable to estimate a magnetic permeability of the formation proximate a button of the array of buttons that is collocated with the respective magnetometer.

3. The borehole imaging system of claim 1, wherein the one or more coils comprise at least two coils, and wherein the at least two coils are axially symmetrically deployed on the borehole imaging tool, and wherein the one or more electrode buttons are placed along an axis of symmetry of the one or more coils.

4. The borehole imaging system of claim 1, wherein the magnetic field source comprises one or more permanent magnets.

5. The borehole imaging system of claim 1, wherein the magnetic field source comprises one or more solenoids.

6. The borehole imaging system of claim 5, wherein the one or more solenoids are C-shaped.

7. The borehole imaging system of claim 1, wherein the borehole imaging tool further comprises a pad that extends towards a wall of the borehole, wherein the array of electrode buttons is positioned on the pad.

8. The borehole imaging system of claim 1, wherein:
the borehole imaging tool further comprises a magnetic field receiver, and
the processor is further operable to:
determine an induced voltage at the magnetic field receiver, the induced voltage being a differential voltage between the magnetic field source and the magnetic field receiver; and
determine the magnetic susceptibility of the formation based on the induced voltage at the magnetic field receiver.

9. The borehole imaging system of claim 1, wherein the processor is further operable to determine the differential voltage based on the induced electric field and the alternating magnetic field detected at each of the two electrode buttons.

10. A method to generate a visual representation of a formation, comprising:
inducing an alternating magnetic field into a formation, the alternating magnetic field in turn inducing an induced electric field;
determining, at two electrode buttons of an array of electrode buttons, a differential voltage between the two electrode buttons, wherein determining the differential voltage between the two electrode buttons is based on a strength of the alternating magnetic field and a strength of the induced electric field proximate the two electrode buttons;
exciting the array of electrode buttons with a galvanic source;
determining a current through the array of electrode buttons;
estimating, based on the differential voltage between the electrode buttons and the current flowing through the array of electrode buttons, a resistivity and magnetic susceptibility of the formation proximate the array of buttons; and
constructing a visual representation of the formation based on the resistivity and magnetic susceptibility of the formation.

11. The method of claim 10, further comprising obtaining an estimate of a lithology of the formation based on the visual representation of the formation.

12. The method of claim 11, further comprising generating at least one of a logging, completion, and production-related decision based on the visual representation of the formation.

13. The method of claim 10, further comprising:
determining, at the two electrode buttons, the strength of the alternating magnetic field and the strength of the induced electric field proximate the two electrode buttons.

14. The method of claim 10, further comprising eliminating a resistivity effect in the magnetic susceptibility based on at least one of measurements indicative of the magnetic susceptibility at multiple frequencies and measurements indicative of the resistivity at multiple frequencies.

15. The method of claim 10, wherein:
determining the differential voltage comprises determining a plurality of voltage measurements of the differential voltage at a plurality of frequencies, and
estimating the resistivity and the magnetic susceptibility of the formation comprises estimating the magnetic susceptibility of the formation based on the plurality of voltage measurements of the differential voltage at the plurality of frequencies.

16. The method of claim 15, further comprising:
determining a real component of the plurality of the voltage measurements;
determining a first difference between the real component of the plurality of the voltage measurements at two different frequencies of the plurality of frequencies;
determining an imaginary component of the plurality of the voltage measurements; and determining a second difference between the imaginary component of the plurality of voltage measurements at the two different frequencies, wherein estimating the resistivity of the formation is based on the first difference and the second difference.

17. The method of claim 10, wherein:

determining the current through the array of the electrode buttons comprises determining a plurality of current measurements of the current at a plurality of frequencies, and estimating the resistivity and the magnetic susceptibility of the formation comprises estimating the resistivity of the formation based on the plurality of current measurements of the current measurements of the current at the plurality of frequencies.

18. The method of claim 10, wherein inducing the alternating magnetic field and exciting the array of the electrode buttons comprises simultaneously inducing the alternating magnetic field and exciting the array of the electrode buttons.

19. A borehole imaging tool, comprising:

a pad;

one or more coils axially symmetrically deployed on the pad and wrapped around the borehole imaging tool;

an array of electrode buttons deployed on the pad, wherein one or more electrode buttons of the array of electrode buttons are placed along an axis of symmetry of the one or more coils, and wherein each electrode button of the array of electrode buttons being operable to detect an induced electric field;

one or more magnetometers, each of the one or more magnetometers being collocated with a different button of the array of buttons;

a galvanic source operable to inject an electrical current through one or more electrode buttons of the array of electrode buttons into a formation; and at least one return electrode operable to receive the current.

* * * * *